Figure 1:
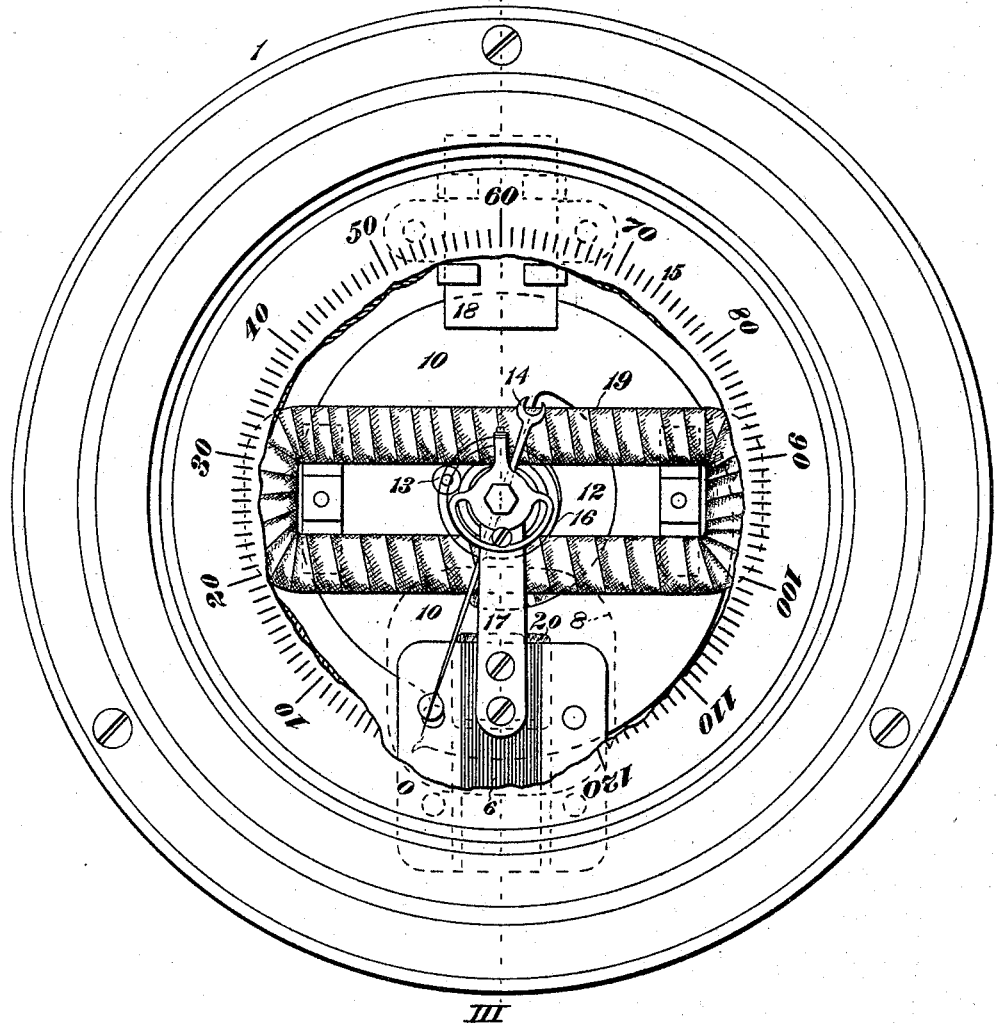

No. 611,592. Patented Sept. 27, 1898.
H. P. DAVIS & F. CONRAD.
ALTERNATING CURRENT VOLT METER.
(Application filed June 18, 1898.)

(No Model.) 3 Sheets—Sheet 1.

WITNESSES:

INVENTORS
Harry P. Davis
Frank Conrad
BY
Wesley G. Carr
ATTORNEY.

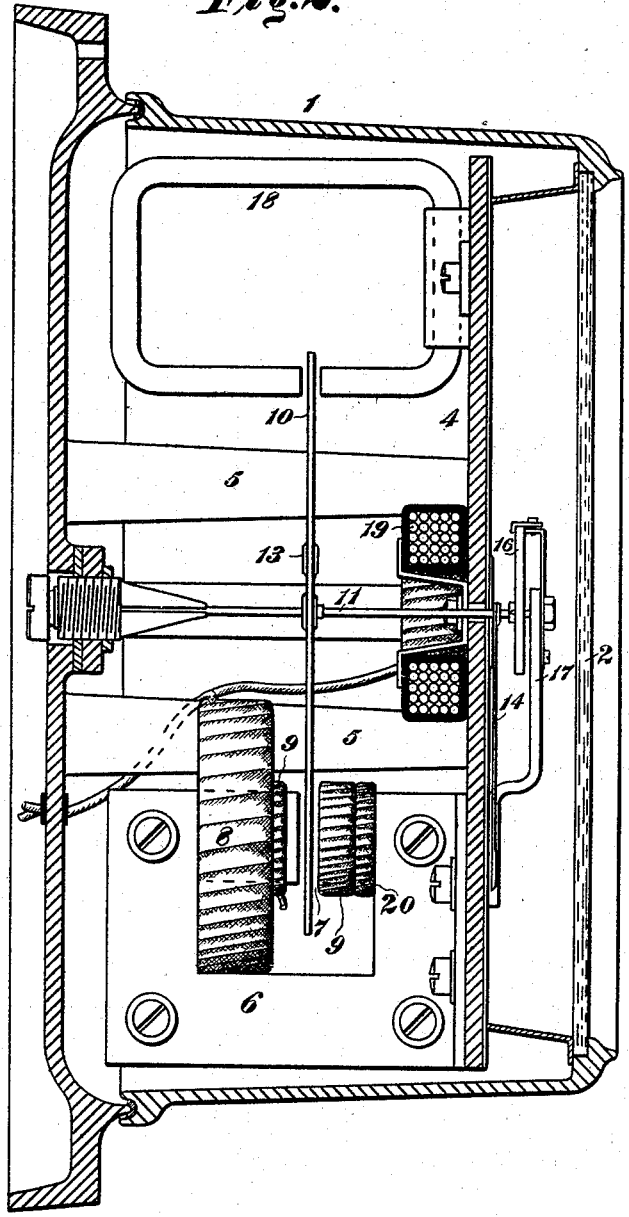

No. 611,592. Patented Sept. 27, 1898.
H. P. DAVIS & F. CONRAD.
ALTERNATING CURRENT VOLT METER.
(Application filed June 18, 1898.)
(No Model.) 3 Sheets—Sheet 3.
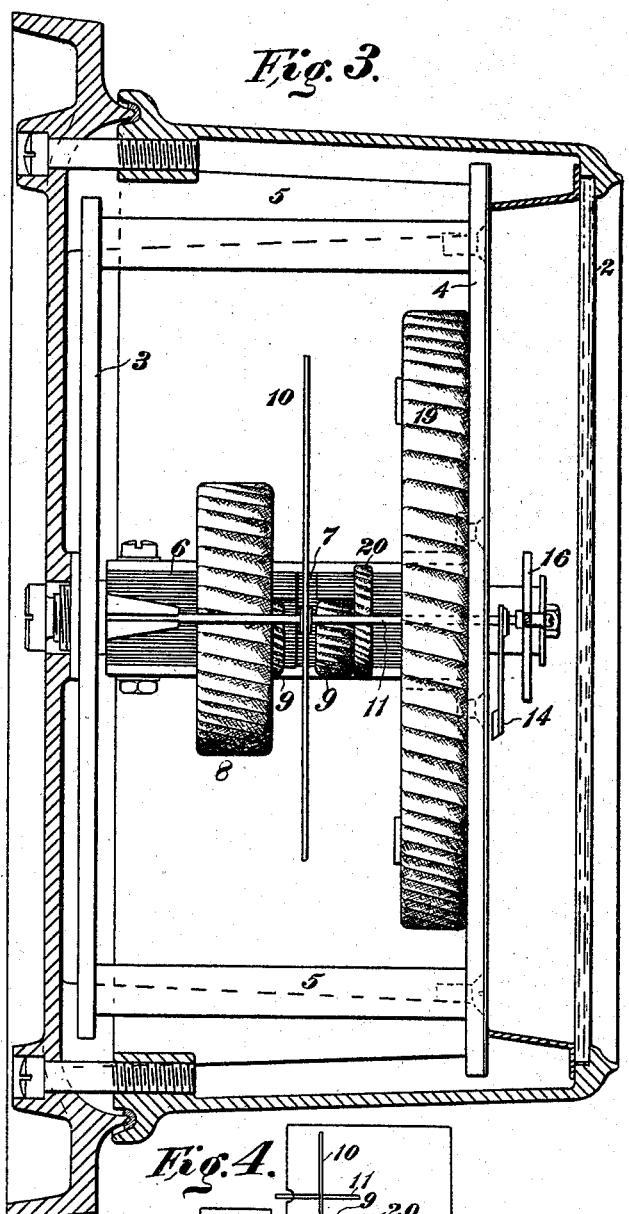
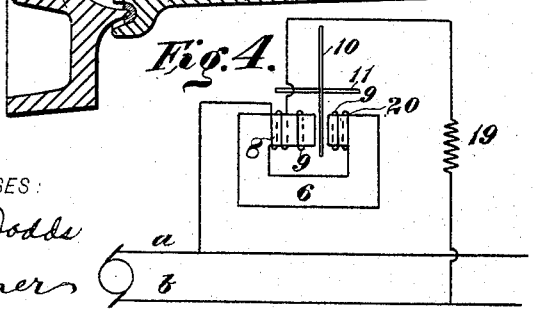
WITNESSES:
Ethan D. Dodds
H. C. Tener
INVENTORS
Harry P. Davis
& Frank Conrad
BY
Wesley G. Carr
ATTORNEY.

UNITED STATES PATENT OFFICE.

HARRY P. DAVIS, OF PITTSBURG, AND FRANK CONRAD, OF WILKINSBURG, PENNSYLVANIA, ASSIGNORS TO THE WESTINGHOUSE ELECTRIC AND MANUFACTURING COMPANY, OF PENNSYLVANIA.

ALTERNATING-CURRENT VOLTMETER.

SPECIFICATION forming part of Letters Patent No. 611,592, dated September 27, 1898.

Original application filed May 7, 1898, Serial No. 680,035. Divided and this application filed June 18, 1898. Serial No. 683,840. (No model.)

*To all whom it may concern:*

Be it known that we, HARRY P. DAVIS, residing at Pittsburg, and FRANK CONRAD, residing at Wilkinsburg, in the county of Allegheny and State of Pennsylvania, citizens of the United States, have invented a new and useful Improvement in Alternating-Current Voltmeters, (Case No. 782,) of which the following is a specification, this application being a division of our application filed May 7, 1898, Serial No. 680,035.

Our invention relates to alternating-current electrical measuring instruments, and particularly to instruments of this class known as "voltmeters" that indicate the electromotive forces of the circuits with which they are connected.

The object of our invention is to provide an instrument of the character indicated which shall be simple and compact in construction and accurate in operation and which shall have a wide range of movement and be adapted to accurately indicate the electromotive force in any alternating-current circuit irrespective of the frequency of alternations and changes in temperature.

In the accompanying drawings, Figure 1 is a plan view or front elevation, according as the instrument is a portable or switchboard instrument, a portion of the face-plate being broken away to show the interior mechanism. Fig. 2 is a view, partially in section and partially in side elevation, of the instrument. Fig. 3 is a view, partially in section and partially in either plan or side elevation, according as the instrument is a switchboard or a portable instrument, the section being taken at right angles to that of Fig. 2. Fig. 4 is a diagram of the circuits of the instrument.

Referring now particularly to the details of construction illustrated in the drawings, 1 is an inclosing case or box for the operating parts of the instrument. This case is provided with a glass front 2, and its sides and back are made of metal, glass, or wood, or a combination of these materials, according to the desires of the manufacturer and the place in which the instrument is to be used.

The operating parts of the instrument are mounted on and supported by an interior framework consisting of a back plate or bar 3, a front plate 4, and connecting-posts 5.

6 is a laminated core having an air-gap 7. A primary actuating-coil 8 is mounted upon one arm of the core 6 and is connected across the work-circuit $a\ b$, the electromotive force of which is to be measured. Mounted upon each arm of the core 6 and adjacent to the air-gap 7 is a coil 9, that is closed upon itself. One side of each coil 9 is located in a slot in the core, so that the magnetic field due to the current set up in these coils is displaced with reference to the field set up by the current passing through the coil 8, and inasmuch as the currents in the coils 9 are produced by induction from the current in the coil 8 there will also be a displacement of phase, and a shifting magnetic field will result.

It will be understood that the invention is not limited to the employment of two coils 9, since the instrument would be operative and useful with only one such coil.

The armature or secondary member of the motor device consists of a disk 10, the periphery of which has the form of one turn of a spiral, as is clearly indicated in Fig. 1 of the drawings. By reason of this construction the disk will project into the air-gap 7 a maximum distance when the disk is at its initial or zero position—that is, when there is no current flowing through the coil 8.

As the electromotive force of the work-circuit, and therefore of the coil 8, increases the armature will be rotated in a clockwise direction by reason of the action of the shifting magnetic field thereon, and as each succeeding point in the disk has a radius of less length than the preceding one the degree to which the armature projects into the air-gap will decrease. This construction of armature enables us to provide an instrument having a uniform scale and one which will accurately indicate the electromotive force in the work-circuit. The armature is rigidly mounted on a shaft 11, which is preferably supported in jewel-bearings, as is usual in instruments of this class, and in order that the armature may be properly balanced upon the shaft we cut out a segmental portion 12 on the side having a greater radius, and if this is not sufficient to properly balance the armature we affix to it, on the opposite side of the shaft, a suitable weight 13. The outer end of the shaft is provided with a hand or pointer 14, which coöperates with a suitable dial-plate 15, as is usual in this class of instruments.

16 is a spiral spring connecting the shaft 11 with a bearing-bracket 17 and is of such composition and strength as to exert the desired degree of force in opposition to the rotative effect imparted by the current in the coils 8 and 9.

18 is a permanent magnet, between the poles of which the armature 10 projects and which coöperates with such armature in a manner well understood in the art to make the instrument dead-beat. This feature may be omitted in certain cases, if desired.

For the purpose of adapting the instrument to different current frequencies we employ a non-inductive resistance-coil 19, which may be located at any convenient point and supported in any desired manner. In the drawings we have shown such coil as clamped to the inner side of plate 4. In order to prevent self-induction, one half of coil 19 should be reversely wound with reference to the other half. The wire of coil 19 is made of metal having a low-temperature coefficient—such, for example, as German silver—and the coil is connected in series with coil 8, as indicated in Fig. 4 of the drawings. If the resistance-coil 19 or its equivalent were not employed, the tendency of the instrument would be to read too low with high frequencies and too high with low frequencies, this being due to the fact that the self-induction of the coil 8 increases with an increase in the rate of alternations, and vice versa. Since the resistance 19 has no self-induction, the difference of potential between its terminals will remain substantially constant for all rates of alternations, and being connected in series with the coil 8 the two may be so proportioned that changes in the rate of alternations will not affect the reading of the instrument to any appreciable extent.

As the coil 19 when connected in series with coil 8 does not compensate for changes in temperature, we surround one limb of the core 6 of the actuating-magnet with a closed coil 20, which consists of a few turns of wire made of metal which has a high-temperature coefficient—such, for example, as copper. The current set up in this coil 20 will tend to demagnetize the core 6, and thus reduce the torque exerted upon the disk 10. Since the amount of this demagnetizing-current depends upon the resistance of the coil, such current will decrease as the coil becomes heated, thus correspondingly decreasing the demagnetizing effect, the result being that the resultant torque exerted upon the disk will not vary to any appreciable extent with changes in temperature.

So much of the apparatus shown and described herein as is adapted for use in connection with instruments employed to measure the amount of current flowing in the circuit as well as the electromotive force is claimed in the application hereinbefore referred to, of which this is a division.

We claim as our invention—

1. In an electrical measuring instrument, the combination with a closed-circuit movable member and means for indicating the extent of its movement against an opposing force, of an actuating-magnet and a non-inductive resistance having a low-temperature coefficient and connected in series with the main coil of the actuating-magnet to compensate for changes in current frequency.

2. In a voltmeter for alternating-current circuits, the combination with a closed-circuit armature, and means for indicating the extent of its movement against an opposing force, of primary and secondary actuating-coils and a non-inductive resistance having a low-temperature coefficient and connected in series with the primary actuating-coil to compensate for changes in current frequency.

3. In a voltmeter for alternating-current circuits, the combination with a closed-circuit armature and means for indicating the extent of its movement against an opposing force, of primary and secondary actuating-coils and a demagnetizing secondary coil having a high-temperature coefficient and compensating for changes in temperature.

4. In an electrical measuring instrument, the combination with a closed-circuit movable member, means for indicating the extent of its movement, and an actuating-magnet having a primary coil, one or more secondary actuating-coils and a demagnetizing-coil having a high-temperature coefficient, of a non-inductive resistance having a low-temperature coefficient and connected in series with the primary actuating-coil to compensate for changes in current frequency.

In testimony whereof we have hereunto subscribed our names this 16th day of June, 1898.

HARRY P. DAVIS.
FRANK CONRAD.

Witnesses:
  WESLEY G. CARR,
  H. C. TENER.